United States Patent [19]
Poulos

[11] Patent Number: 5,799,610
[45] Date of Patent: Sep. 1, 1998

[54] SELF-FILTERING LITTER BOX FOR PETS

[76] Inventor: Louis Poulos, 441 Apricot La., Mountain View, Calif. 94040

[21] Appl. No.: 610,272

[22] Filed: Mar. 4, 1996

[51] Int. Cl.⁶ .................................................. A01K 1/01
[52] U.S. Cl. ........................................ 119/166; 119/168
[58] Field of Search .................................. 119/166, 165, 119/168, 673, 530, 527, 528, 529, 480

[56] References Cited

U.S. PATENT DOCUMENTS

| | | |
|---|---|---|
| 3,908,597 | 9/1975 | Taylor ................................ 119/166 |
| 4,359,966 | 11/1982 | Casino ............................... 119/166 |

Primary Examiner—Gene Mancene
Assistant Examiner—Yvonne Abbott
Attorney, Agent, or Firm—James E. Eakin

[57] ABSTRACT

A litter box assembly for pets includes two identical, stackable litter boxes each having a bottom with a pattern of openings and pointed, raised projections. A track extends around the bottom of each box to hold a plate with defines mating apertures and slides back and forth in the track to, respectively, align the openings and close off the openings. A handle on each box attaches to the plate and may be moved to the open position to allow unclumped litter to flow into the box stacked below. The clumped waste is held off the bottom of the box on the raised projections for disposal by dumping. The lower box containing the filtered litter is moved to the top position of the stack to be ready for use.

8 Claims, 4 Drawing Sheets

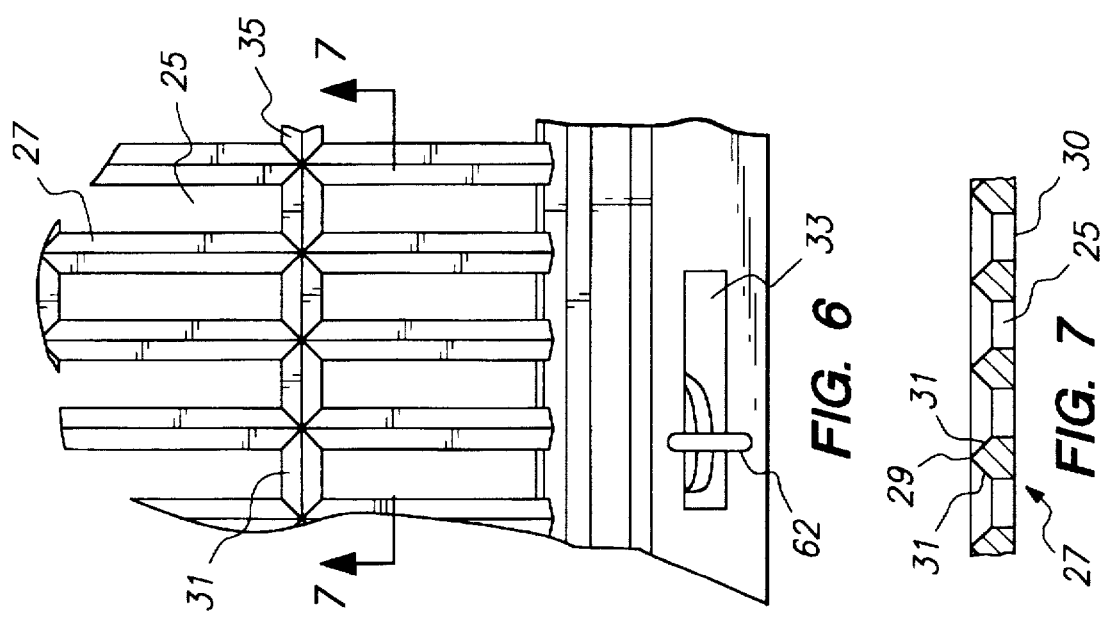
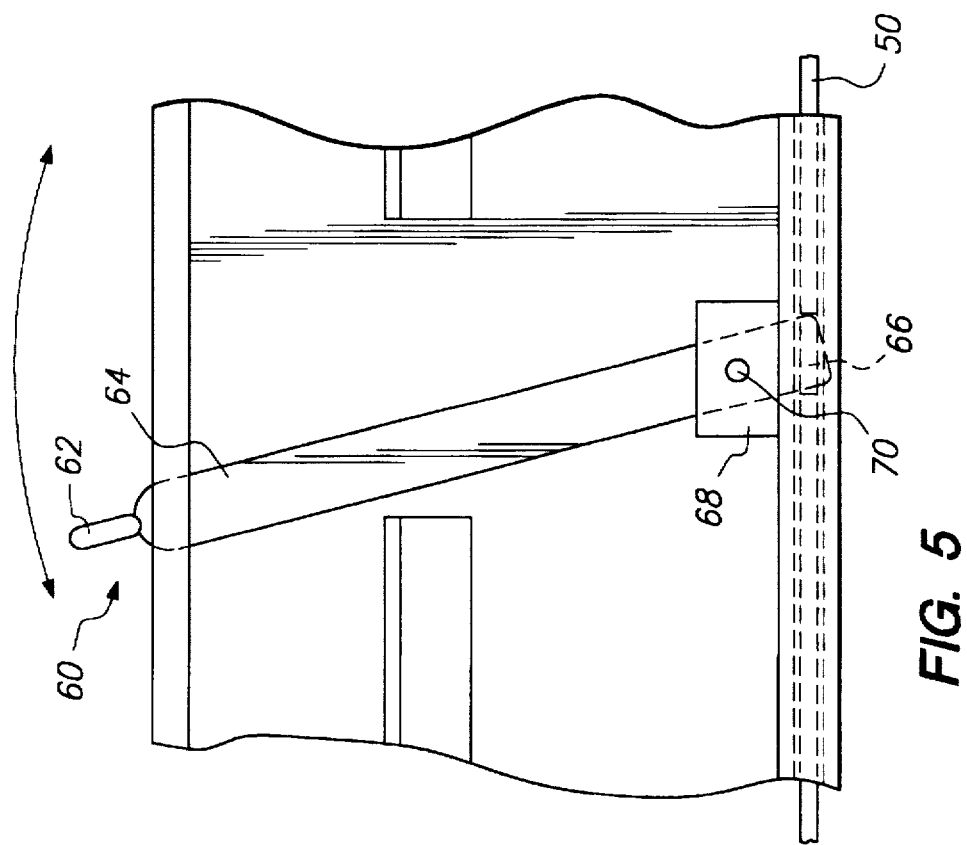

5,799,610

SELF-FILTERING LITTER BOX FOR PETS

FIELD OF THE INVENTION

This invention relates to litter boxes for pets. More specifically, the invention relates to a litter box enabling filtering of the "clumping" varieties of litter to isolate and dispose of clumped waste.

BACKGROUND OF THE INVENTION

Pet litter boxes require frequent cleaning to reduce odor, eliminate urine and fecal waste, and to satisfy cats which tend to be fastidious. The advent of "clumping" types of litter simplified the task of cleaning cat litter boxes because clumping litter contains particles that coat and bind both solid and liquid waste which forms into clumps that may be scooped out of the litter box using a hand held slotted scoop. Although clumping litter simplifies cleaning, frequent cleaning operations must continue and require the pet owner to repeatedly sift through the litter box with the scoop to locate and retrieve the clumps of solidified waste. The pet owner may elect to completely throw out all of the cat litter in the box when the clumped waste is broken up into many pieces so that scooping them out becomes time consuming and tedious. The task of cleaning a cat box is distasteful to most and potentially harmful to some, particularly pregnant women, because such waste may contain air-borne Histoplasmosis bacteria.

At least one litter box product does exist to simplify cleaning operations. The device, costing at least several hundred dollars, operates with a timer and sensor so that the clumps formed in the clumping litter are mechanically isolated and automatically moved into a collection container for pick up and easy disposal.

Several prior art patents describe box devices said to simplify animal waste disposal. One such system is described in U.S. Pat. No. 3,908,597 as a filtering system for non-clumping types of litter and having two stackable boxes each with a removable lid and a removable screen type shelf for supporting only solid animal waste. The two stackable boxes and parts fit into recesses on either side of a removable barrier in the center of a central box. Following removal of the barrier and filtering, the barrier must be replaced and the entire six piece assembly must be picked up and inverted prior to re-use.

Another animal litter box device is described in U.S. Pat. No. 4,359,966 and includes a screen defining pyramid shaped elements. The screen must be buried in the bottom of the box and handles are provided to manually pull the screen upward to cause filtering. The '966 patent requires that the pet owner empty the sifted litter from the box in order to replace the screen at the bottom of the box.

A heretofore unmet need exists for an inexpensive, simple to use, self-filtering litter box for pets for enabling easy disposal of clumped solid and liquid waste formed from clumping types of cat litter.

SUMMARY OF THE INVENTION WITH OBJECTS

A self-filtering litter box assembly for pets includes two stackable litter boxes each defining a bottom wall with openings therethrough and interspersed with upwardly projecting members. Each box defines a bottom lip forming a track for supporting a grid mounted within the track. The grid may be opened or closed, or slid back and forth within the track, using a handle or the like. When slid, or otherwise moved to the open position, filtering occurs because openings in the grid align with the openings in the bottom wall of the upper litter box. Following filtering of unclumped waste into the lower litter box, the solid waste in the upper box is dumped out, the grid is closed, and the lower box with the filtered litter is placed on top of the empty box.

A general object of the present invention is to provide a litter box for pets that overcomes the limitations and drawbacks of the prior art.

A specific object of the present invention is to provide a self-filtering litter box for pets that is inexpensive, easy to use, and has few parts.

Another specific object of the present invention is to provide a self-filtering litter box for pets for use with "clumping" varieties of litter.

Yet an additional specific object of the present invention is to provide a self-filtering litter box for pets comprised of two unitary, stackable boxes each defining a bottom surface having a pattern of openings for filtering and having projecting members for support of solid, clumped waste.

Still another specific object of the present invention is to provide a self-filtering litter box for pets assembly having a movable barrier grid to allow filtering from one box into another box stacked below.

Yet an additional object of the present invention is to provide a self-filtering litter box to facilitate removal of pet urine and fecal material for sanitary reasons.

These and other objects, advantages and features of the present invention will become more apparent upon considering the following detailed description of a preferred embodiments, presented in conjunction with the accompanying drawings.

BRIEF DESCRIPTION OF THE DRAWINGS

FIG. 5 is an enlarged view of the handle mechanism shown from lines 5—5 in FIG. 2.

FIG. 6 is an enlarged top view of the bottom surface of the box assembly of FIG. 1 showing the projecting members and openings.

FIG. 7 is a cross sectional view of the bottom surface of the box taken along lines 7—7 in FIG. 6.

DETAILED DESCRIPTION OF PREFERRED EMBODIMENTS

Figure 1:
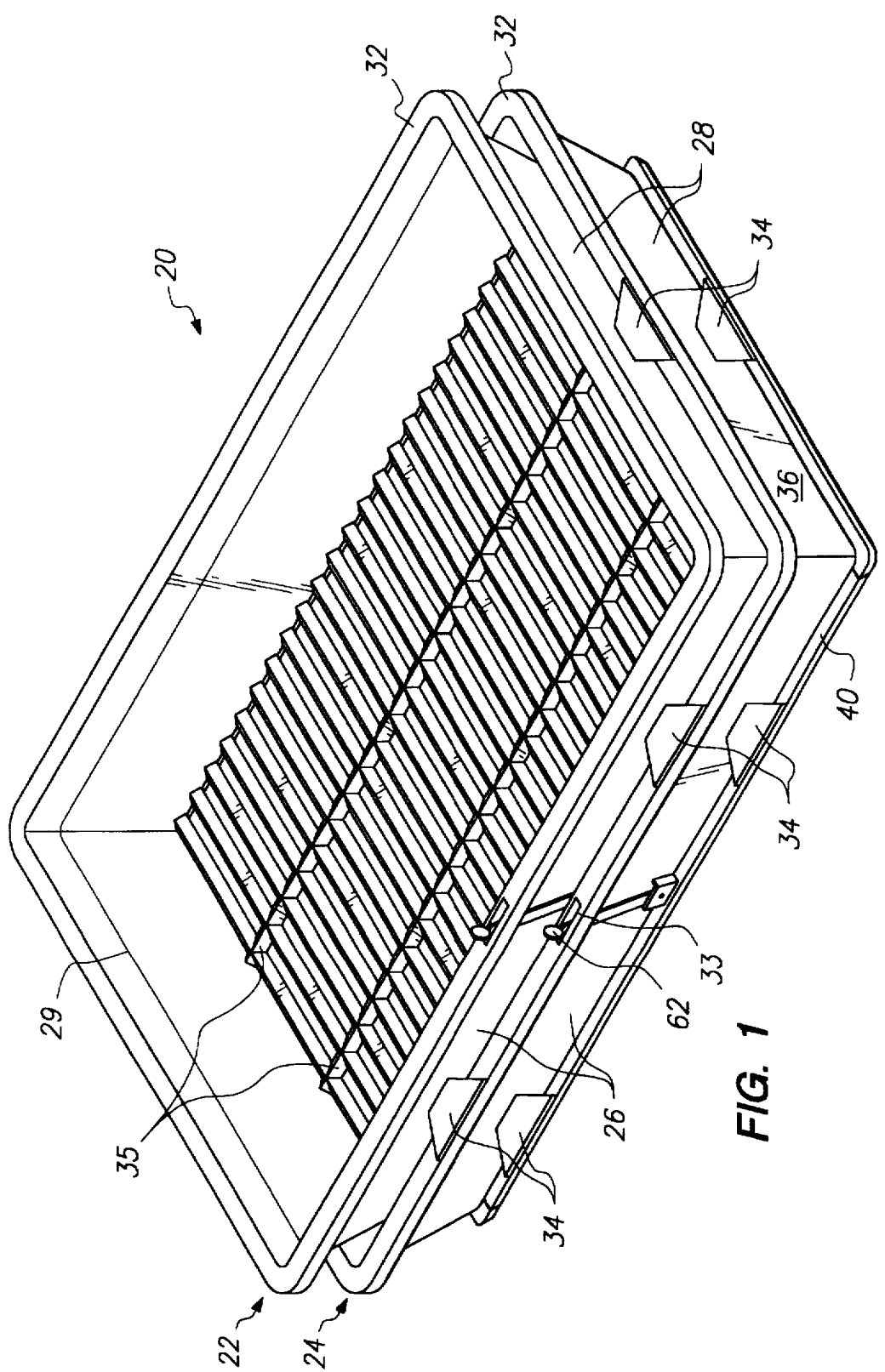
FIG. 1 is a perspective view of a stacked litter box assembly for pets embodying principles of the present invention.

A self-filtering litter box assembly for pets is shown generally in the figures as reference number 20. The litter box assembly 20 preferably is molded from a strong plastic material, although other materials, such as rubber, may be used as well. A non-porous material or coating, for example, Teflon, is used to prevent absorption of animal waste and to facilitate washing of the litter box assembly 20. As shown in FIG. 1, the preferred litter box assembly 20 includes two, identical stackable litter boxes—upper litter box 22 and lower litter box 24.

Figure 4:
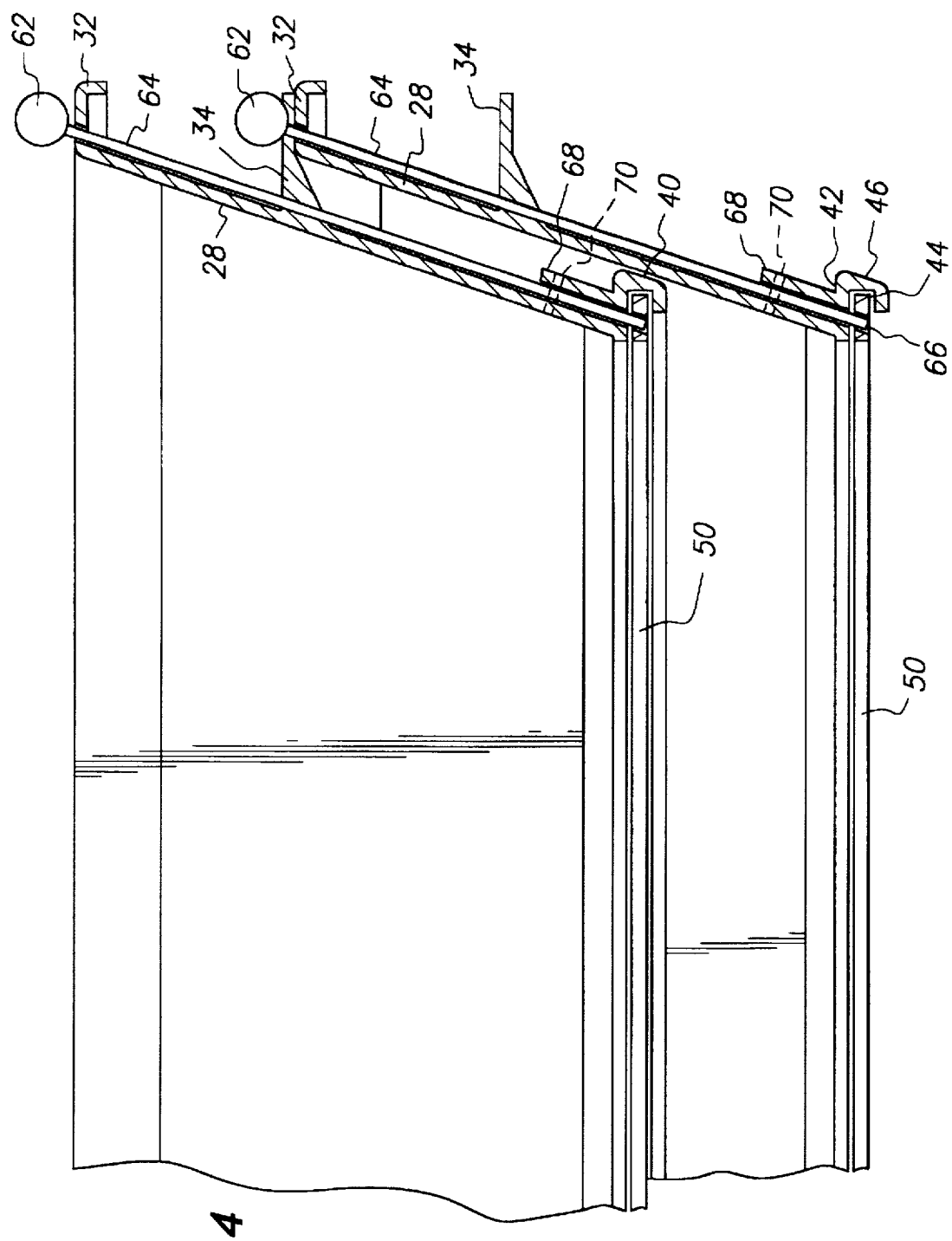
FIG. 4 is a cross sectional view of a portion of the stacked litter box assembly for pets taken along lines 4—4 in FIG. 2.

Each litter box 22, 24 preferably is of injection molding construction and defines two side walls 26, two end walls 28, and a bottom wall 30. Each litter box 22, 24 further defines a top lip 32 for ease of grasping the boxes 22, 24 with the hands. The side walls 26 and end walls 28 taper inwardly slightly, as best seen in FIG. 4, so that the area of the bottom wall 30 is slightly smaller than the open area at the top edge of each litter box 22,24. When stacked, the boxes 22, 24 are not so tall to prevent an average house cat from stepping into the litter box assembly 20 with ease. It will be recognized by those skilled in the art that the boxes 22, 24 need not be rectangular and may be round, square, or any other shape as desired. Additionally, the boxes 22, 24 may be fitted with a conventional, full, top cover, or they may have a conventional, removable collar around the upper perimeter to minimize scattering of the litter outside of the box.

The bottom wall 30 of each litter box 22, 24 defines a plurality of slots 25 arranged in generally parallel, spaced apart rows and columns throughout the bottom wall 30. As best shown in FIGS. 6 and 7, the slots 25 shown are generally rectangular, although the corners may be rounded. The slots 25 create openings through the bottom wall 30 and are sized to be smaller than the waste clumps generally formed by clumping litter for pets.

Figure 2:
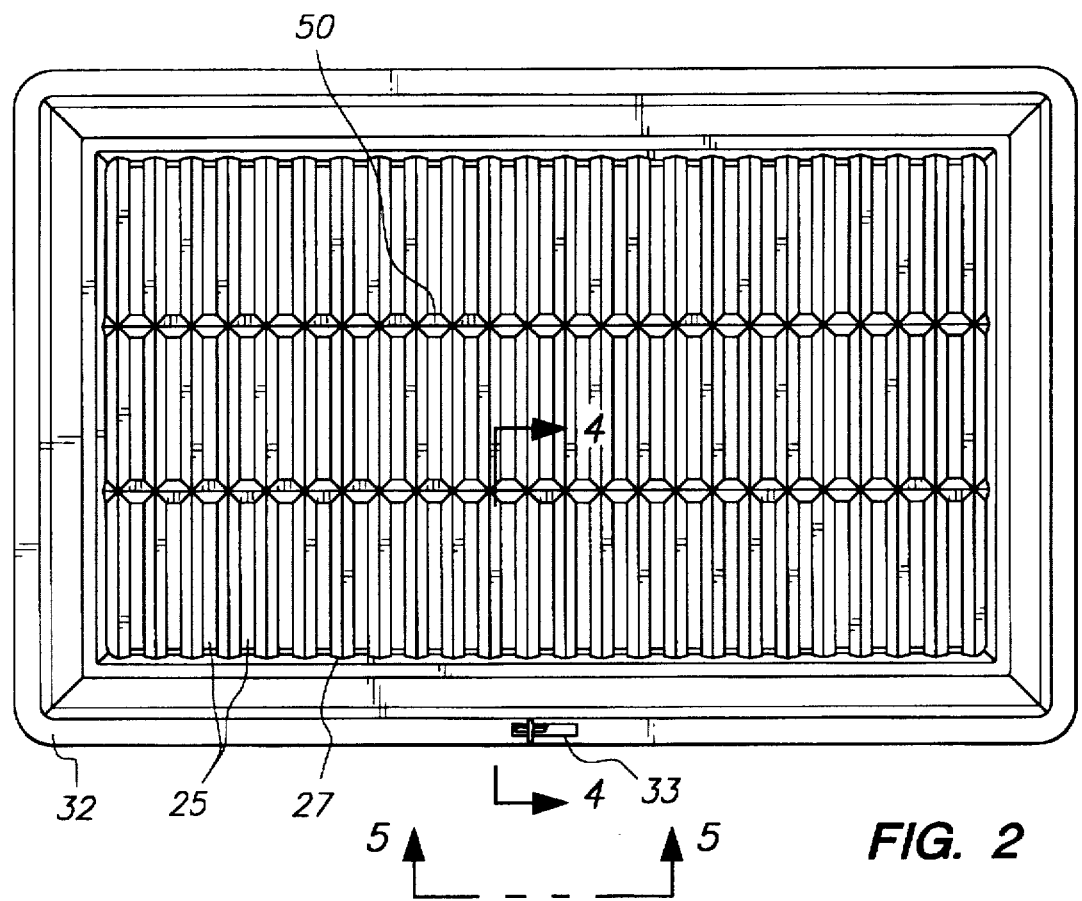
FIG. 2 is a top view of a litter box assembly for pets showing the openings and raised projecting member pattern in the bottom wall.

A plurality of projecting members 27 are interposed between and generally parallel to the rows of slots 25 to extend outwardly and project upwardly from the planar surface of the bottom wall 30. As best seen in FIGS. 6 and 7, the projecting members 27 are elongated bars having peaked tops 29 and paired sloping sides 31. The projecting members 27 and slots 25 preferably are formed during molding of the litter boxes 22, 24, although the slots 25 may be stamped out after construction of the boxes 22, 24, and the projecting members may be separately constructed and attached to the bottom wall 30. As shown in FIGS. 1 and 6, the projecting members preferably include additional longitudinal rows of projecting members 35 arranged generally at right angles to the rows of projecting members 27. The projecting members 35 provide additional strength and support for the bottom wall 30 and also define sloping sides 31. The arrangement of the slots 25 and projecting members 27 is presented as an example only and it will be recognized by those skilled in the art that any shape may be used for the openings which need not be provided in parallel rows. Additionally, the projecting members 27 may have other configurations, such as individual, spaced apart knobs protruding from the bottom surface 30, and the projecting members need not be parallel to the slots 25. As shown in FIG. 2, the longitudinal rows of projecting members 35 may be omitted. Peaked protrusions are preferred to minimize retention of litter within the box 22 during filtering operations by reducing surface area so that the litter slides down sides 31 to the area of the slots 25. Additionally, peaked protrusions better support clumps of waste formed in the clumping type of litter preferred for the litter box assembly 20 for pets.

Preferred guide flanges 34, best shown in FIG. 4, are spaced around the exterior wall surface 36 with at least one, and preferably two, guide flanges on each of the side walls 26. Alternatively, the guide flange 34 may be a unitary flange that extends around the entire outside wall surface of the boxes 22, 24. The preferred guide flanges 34 extend outwardly from the exterior wall surface 36, which includes the exterior of the side walls 26 and the end walls 28. The guide flanges 34 center the upper box 22 within the lower box 24, prevent the boxes from becoming wedged together when stacked, and allow the upper box 22 to extend near to, but not to the bottom of, the bottom wall of the lower box 24 when the boxes 22, 24 are stacked. The guide flanges 34 of the upper box support the upper box 22 when the boxes 22, 24 are stacked and are positioned to rest on the top of the lip 32 of the lower box 24. Alternatively, the guide flanges 34 may be shorter in length and of a more rounded construction to contact the slightly, inwardly tapering walls 26, 28 of the lower box 24. The flange 34 also may project from the interior walls of the litter boxes 22, 24, particularly in those cases where the boxes used do not have tapering walls. Tapering walls are preferred for stackable designs so that all of the stackable members can be of the same size.

Referring also to FIG. 4, a lower, molded bracket 40 is provided and encircles the lower edge of each box 22, 24. The preferred bracket 40 is molded during construction of the boxes 22, 24, in which case the bracket 40 is omitted on one end wall 28. Alternatively, the bracket 40 may be manufactured as several separate pieces with conventional snap mount protrusions (not shown) for snap lock mounting into mating holes (not shown) provided around the bottom edge of the side and end walls 26, 28. The bracket 40 defines a top leg 42 connected to a lower leg 44 by integral connecting leg 46. The legs 42, 44 and connecting leg 46 form the generally U-shaped bracket 40 with interior recess 48.

Figure 3:
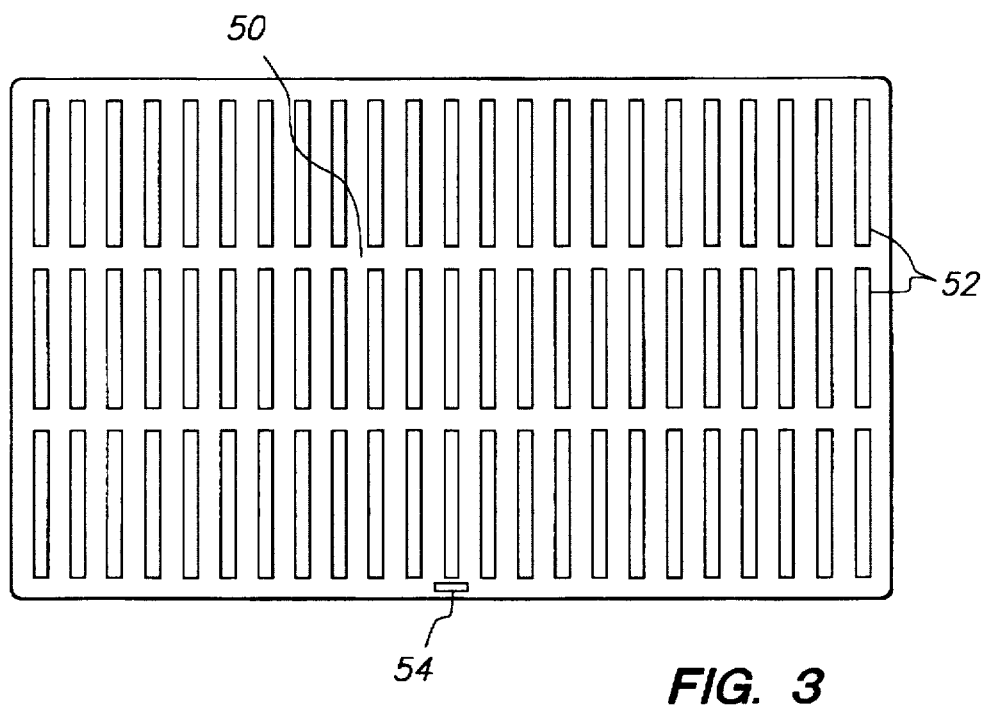
FIG. 3 is a top view of the grid showing the openings therein.

Recess 48, which preferably extends around both sides and one end of each box 22, 24, to form a support track for a grid plate 50. When the bracket 40 in provided in several pieces and extends around the entire perimeter of each box, the grid plate 50 may be removed from the bracket 40 when a more thorough cleaning of the cat litter box assembly 20 is desired by pulling off a snap mounted end portion of the bracket 40. The grid plate 50 preferable is made from the same material as the litter boxes 22, 24 and is sized slightly smaller, particularly in length, than the outer dimension of the recess 48. As best shown in FIG. 3, the grid plate 50 is a planar body defining a plurality of slotted openings 52 like the openings 25 in the bottom walls 30. The openings 52 are preferred, but other shapes may be used for the openings, or the grid plate 50 may define a screen surface. Preferably, the openings 52 are sized slightly larger than openings 25 to minimize retention of litter during filtering. Alternatively, the grid plate 50 may be formed as a louver plate. A slot 54 near one edge of the grid plate 50 is provided and the use of the slot 54 is described below.

Referring now to FIGS. 4–6, a handle assembly 60 is shown for operating the grid plate 50. The handle assembly 60 includes an operating knob 62 at the top end of an actuating lever 64 which terminates in an actuating end 66 which is engaged in slot 54. A handle assembly 60 is attached to an outer side wall 26 of each litter box 22, 24 by placing the actuating end 66 within a bracket 68 which extends upwardly above the U-shaped bracket 40. A hinge pin 70 is secured through a hole in the bracket 68 and into a hole in the end 66. The bracket 68 and pin 70 provide a pivot point for the handle assembly 60. The top end of the lever 64 extends through an aperture 33 in the top lip 32. Moving the knob 62 back and forth in the directions of the directional arrows in FIG. 5 causes the actuating end 66 of the lever 64 to pivot at the bracket 68. Movement of the pivoting end 66 in the slot 54 causes movement of the grid plate 50. In the embodiment shown, the grid plate is slide back and forth in the recess 48 longitudinally with respect to the box 22. The dimensions of the recess 48 limit movement of the grid plate 50 mounted within the recess 48, and the lever end 66 also may open and close louvers where the grid plate 50 is formed as a louver assembly. The lever 64 may be formed as a rod or a flat bar and need not terminate in a knob. It is preferred to place a legend around the aperture 33, such as "O" for the open position and "C" for the closed position. Movement of the knob 62 to the open position causes the grid plate 50 to move in the opposite direction until the slots 52 align with the slots 25 thereby allowing unclumped litter to flow from litter box 22 into litter box 24. Movement of the knob 62 to the closed position causes the grid plate 50 to move in the opposite direction until the slots 52 are no longer aligned with slots 25 thereby preventing unclumped litter from flowing from litter box 22 into litter box 24.

Use and maintenance of the cat litter box assembly 20 is as follows. The knob 62 of the lower box 24 is moved to the closed position prior to placement of the upper box 22 into the lower box 24. With the knob 62 of the upper box 22 in the closed position, a conventional clumping variety of cat litter is added to the fill line 29 which provides a depth of approximately five inches of litter. The clumping litter typically includes granules which instantly coat and bind both solid and liquid waste into clumps. A depth of approximately five inches allows liquid waste to be coated and formed into clumps without reaching the bottom wall 30 in liquid form. When the owner wishes to remove clumped waste material following use of the litter box assembly 20 by a cat, the owner moves the knob 62 of the upper box 22 to the "open" position to allow unclumped litter to flow through the aligned slots 25, 52 into the lower litter box 24. When the knob 62 is moved to the "open" position, the owner may lift up on the top box 22 and shake the box slightly to enhance flow of unclumped litter into the lower box 24. Following filtering, clumps of waste will remain in the upper box 22 resting on and between the projecting members 27. The projecting members 27 and 35 generally prevent the clumped waste from clogging the slots 25. The solid waste is dumped into a waste receptacle, the knob is moved to the closed position, and the lower box 24 is stacked atop the lower box 22. The litter box assembly 20 is ready for use. The assembly 20 may be hosed down or washed, with or without removing the grid plates 50 by pulling off one end of the snap mounted bracket 40.

It will be recognized by those skilled in the art that the cat litter box assembly can be simplified for those who wish to obtain only one box as described. A single litter box as described herein may be placed in a conventional, unmodified plastic container of roughly the same dimensions. Following filtering into the lower, conventional container, the cat owner would empty solid waste from the litter box and close the grid plate. Next, the cat owner would pour the unclumped litter from the conventional container back into the litter box and place the litter box back into the conventional container.

While this invention has been described in connection with preferred embodiments thereof, it is obvious that modifications and changes therein may be made by those skilled in the art to which it pertains without departing from the spirit and scope of the invention. For instance, the lever assembly may be placed on the inside of the litter boxes or on the end walls of the litter boxes. Alternatively, a sliding arm may be provided on each side of the box lip. The cat litter box assembly may be made in any size, including a smaller travel size, and may include any conventional litter box ad-on, such as removable anti-scatter collars and full covers. Accordingly, the aspects discussed herein are for illustration only and should not limit the scope of the invention herein which is defined by the claims.

What is claimed is:

1. A litter box for use with clumping varieties of cat litter comprising:

at least one container defining a planar bottom wall having at least one side wall connected thereto and extending outwardly and upwardly therefrom, the planar bottom wall defining a plurality of openings therethrough and a plurality of projecting members extending outwardly therefrom;

track means defining a recess and extending around at least a portion of the at least one side wall;

grid means mounted within the recess and below the planar bottom wall, the grid means having an open and closed position within the recess, the open position aligning openings in the grid means with the openings in the bottom wall; and actuation means connected to the grid means for moving the grid means to the open and closed positions.

2. The litter box of claim 1 comprising two, stackable containers.

3. The litter box of claim 2 further comprising guide flange means on the stackable containers for preventing the planar bottom wall of a top container from resting against the planar bottom wall of a bottom container when the two, stackable containers are stacked together.

4. The litter box of claim 2 wherein the track means is a generally U-shaped bracket.

5. The litter box of claim 4 wherein the track means extends around an entire perimeter of the at least one side wall and a portion of the track means is removably mounted to the at least one side wall, removal of the portion of the track means enabling removal of the grid means from the recess.

6. The litter box of claim 2 wherein the grid means is a plate defining a plurality of apertures, operation of the actuation means causing the grid means to slide back and forth within the recess to align the apertures of the grid means with the openings in the bottom wall.

7. The litter box of claim 2 wherein the actuation means is a handle having a first end operatively connected to the grid means and a second end for manually moving the handle.

8. A litter box assembly for use with clumping cat litter comprising:

two, stackable containers each defining a bottom wall and at least one side wall surrounding a perimeter of the bottom wall, each of the two stackable containers further defining a stop means mounted on the at least one side wall for limiting a stackable depth, each bottom wall defining a pattern comprised of a plurality of openings therethrough interspersed with a plurality of outwardly extending members;

bracket means for defining a recess therein and extending at least partially around the at least one side wall;

grid means mounted within the recess and having a closed and an open position, the open position for enabling unused clumping cat litter to filter from a top one of the two stackable containers into a bottom one of the two stackable containers; and actuation means for moving the grid means to the closed and the open positions.

* * * * *